United States Patent Office 3,466,340
Patented Sept. 9, 1969

3,466,340
ALCOHOL PURIFICATION PROCESS
Harry S. Leach and Johnny L. Slate, Texas City, Tex., assignors to Monsanto Company, St. Louis, Mo., a corporation of Delaware
No Drawing. Filed May 29, 1967, Ser. No. 642,200
Int. Cl. C07c 29/24, 27/26
U.S. Cl. 260—643
6 Claims

ABSTRACT OF THE DISCLOSURE

Removal of iron carbonyls from streams by using weak base ion exchange resins containing primary and secondary amino groups and mixtures thereof.

BACKGROUND OF THE INVENTION

The present invention relates to a process for the purification of fluid streams. More particularly, the present invention is directed to the removal of iron carbonyls from said streams.

Many different products are produced by the catalytic reaction of carbon oxides with hydrogen. Mixtures of hydrocarbons, methanol, higher alcohols, ketones and aldehydes are all produced, for example, in the well-known Fischer-Tropsch synthesis which involves the reaction of carbon monoxide and hydrogen or carbon monoxide, carbon dioxide and hydrogen over a suitable catalyst. In the so-called Oxo process, a mixture of carbon monoxide, hydrogen, and olefins is reacted in the presence of a catalyst to produce a product comprising aldehydes, alcohols, and hydrocarbons. In these processes as well as others which employ mixtures of hydrogen and oxides of carbon as reactants, the products are frequently contaminated with iron carbonyls. The iron carbonyl impurities which include iron tetracarbonyl, and, most frequently, iron pentacarbonyl, are formed as a result of the reaction of the carbon monoxide with the iron present in many of the catalysts employed or directly with the reactor itself. Inasmuch as the iron carbonyls can act as catalyst poisons, their removal from streams containing them is expedient if such streams are to be employed in subsequent processes utilizing catalysts sensitive to iron carbonyls.

SUMMARY

It is, therefore, an object of the present invention to provide a process for the purification of streams containing iron carbonyls. Another object of the present invention is to provide a process for the removal of iron carbonyls from the products obtained by reacting a mixture comprising hydrogen and carbon monoxide. A still further object of the present invention is to provide a process for the removal of iron carbonyl from alcohols, particularly methanol.

These and other objects which will become apparent from what follows hereinafter can be accomplished by practicing the process of the present invention for the removal of iron carbonyls from streams containing said iron carbonyls which comprises passing said streams through a bed of a weak base ion exchange resin having at least a portion of the functional groups chosen from the class consisting of primary and secondary amino groups and mixtures thereof.

DESCRIPTION OF THE PREFERRED EMBODIMENTS

The primary requirement of the ion exchange resins employed in the present invention is that they contain functional groups chosen from the class consisting of primary and/or secondary amino groups. Generally, the ion exchange resins used consist of cross-linked hydrocarbon polymers on which are carried the functional groups, i.e., the primary and/or secondary amino groups. The preferred resins have a matrix of cross-linked polystyrene such as a copolymer of a major proportion of styrene and a minor proportion of divinylbenzene as a cross-linking agent. Other cross-linking agents such as butadiene or isoprene may be employed. The functional groups, i.e., the primary and/or secondary amino groups can be introduced into the resin by well-known chemical techniques. A preferred method involves chloromethylation of the polystyrene matrix followed by treatment with ammonia and/or primary amines. The latter treatment results in a polyfunctional weak-base resin containing primary, secondary and tertiary amino groups. Suitable resins for the practice of this invention may also be prepared by polymerization of acrylic and methacrylic acids in the presence of certain polyamines such as, for example, diethylene diamine.

The ion exchange resin may be in various forms such as beads or granules, those having a matrix of cross-linked polystyrene generally being in the form of beads. The size of the resin particles is not critical and generally may range from 10–70 mesh with a preferred range being 20–50 mesh.

The process of the present invention may be carried out over a broad range of temperatures, the upper limit of which is the decomposition temperature of the resin, generally around 100° C., the lower limit being dictated by the kinetics of the reaction between the iron carbonyl and the functional primary and/or secondary amino groups of the resin. The latter reaction is favored by higher temperatures. Preferably, however, the process of the present invention is carried out at temperatures between 0° C. and 90° C. with the range between 10° to 50° C. being particularly desirable. While the iron carbonyl-containing streams may be passed through the resin bed as in the gaseous state, they are usually treated in the liquid phase. When the stream being purified is an alcohol or mixtures of alcohols, treatment in the liquid state is preferred.

Pressures from atmospheric or lower up to several atmospheres, i.e., 15 atmospheres or higher, may be used in the practice of the present invention. Usually, a pressure at or near atmospheric is employed. However, higher pressures may be resorted to if it is desired to keep the stream being purified in the liquid phase. For example, in the purification of a methanol stream at a temperature above its boiling point, in order to purify the stream as a liquid, a pressure above atmospheric must be employed.

The flow rate of the stream being purified through the resin bed is a matter of choice, provided the load limit of the bed is not exceeded. Usually, a flow rate of from 0.05 to 4 gallons per cubic foot of resin per minute is employed. While the maximum flow rate will depend on the concentration of the iron carbonyl impurities in the stream and the size of the particular resin bed being used, it will normally fall within the above range.

Almost any stream containing iron carbonyls may be purified by the practice of the present invention. More frequently, however, the iron-carbonyl-containing streams will be those resulting from the reaction of a mixture comprising carbon monoxide and hydrogen wherein iron is present in the catalyst and/or the reactor system itself. The present invention is most useful in the removal of iron carbonyls from streams comprised of an organic compound having at least one hydroxyl group, particularly monohydroxy alcohols having from 1–15 carbon atoms. Examples of such alcohols include ethanol, isopropanol, n-butanol, the octanols, the decanols, 1-dodecanol, tridecanol, etc. In its preferred embodiment, the process of the present invention is used for the removal of iron carbonyls from methanol produced by the catalytic reaction of carbon monoxide and hydrogen. It is to be emphasized, however, that the present invention is not limited to purifying alcohols produced by the reaction of mixtures comprising hydrogen and carbon monoxide.

When the resin beds used in the present invention have been exhausted, they may be regenerated by passing an aqueous 5% sodium hydroxide solution through the bed followed by washing with water.

The present invention will be further illustrated by the following examples which, however, are not to be construed as limitations thereof.

EXAMPLE 1

A resin bed was prepared by filling a 1.25 cm. x 70.5 cm. tube with a weak-base ion exchange resin commercially available and known to the trade as Amberlite IRA-45. This particular resin contains primary, secondary and tertiary amino groups as functional groups carried on a matrix comprised of a styrene-divinylbenzene copolymer. The resin was in the form of beads of 20–50 mesh size. Five hundred ml. of a solution of 10 parts per million of iron pentacarbonyl in methanol was charged to a reservoir above the packed tube and passed through the bed at the rate of 0.33 gallon per cubic foot per minute at atmospheric pressure and 25° C. The effluent was collected in five separate 100-ml. portions. Each portion was analyzed for iron by an atomic adsorption spectroscopic technique. The results are tabulated below.

| | Iron concentration (p.p.m.) |
|---|---|
| 1st (100 ml.) | None detected |
| 2nd (100 ml.) | None detected |
| 3rd (100 ml.) | None detected |
| 4th (100 ml.) | None detected |
| 5th (100 ml.) | None detected |

EXAMPLE 2

A sample of 1500 ml. of methanol containing 100 parts per billion of iron pentacarbonyl was treated according to the procedure of Example 1 except the effluent was not collected in separate portions. A sample of the trated methanol was analyzed for iron as per Example 1. No iron was detected in the treated methanol.

As the above examples conclusively demonstrate, the practice of this invention provides an excellent process for the complete removal of iron carbonyls from materials containing the same.

What is claimed is:

1. A process for the removal of iron carbonyls from a stream comprising alkanols having from 1–15 carbon atoms which comprises passing a said stream containing said iron carbonyls at a temperature of from 0° C. to 100° C. through a bed of a weak-base ion exchange resin having at least a portion of its functional groups chosen from the class consisting of primary and secondary amino groups and mixtures thereof.

2. The process of claim 1 wherein said stream comprises methanol.

3. The process of claim 2 wherein the iron carbonyl is iron pentacarbonyl.

4. The process of claim 3 wherein the temperature is from about 10° C. to about 50° C.

5. The process of claim 4 wherein the pressure is sufficient to keep said stream in the liquid phase.

6. The process of claim 5 wherein the resin portion of said weak-base ion exchange resin is a styrene-divinylbenzene copolymer.

References Cited

UNITED STATES PATENTS

| 2,628,986 | 2/1953 | Wallace et al. |
| 2,641,543 | 6/1953 | Unger et al. |
| 2,839,569 | 6/1958 | Kramer. |
| 3,373,180 | 3/1968 | Glass et al. |

FOREIGN PATENTS

| 1,101,383 | 3/1961 | Germany. |

LEON ZITVER, Primary Examiner

J. E. EVANS, Assistant Examiner

U.S. Cl. X.R.

260—450